US012011840B2

(12) United States Patent
Cutler et al.

(10) Patent No.: US 12,011,840 B2
(45) Date of Patent: Jun. 18, 2024

(54) ROTATABLE TOOL HEAD

(71) Applicant: Harbor Freight Tools USA, Inc., Calabasas, CA (US)

(72) Inventors: Jeffrey N. Cutler, Anderson, SC (US); James Parks, Santa Clarita, CA (US); Curtis Henry Watenpaugh, Fontana, CA (US)

(73) Assignee: Harbor Freight Tools USA, Inc., Calabasas, CA (US)

( * ) Notice: Subject to any disclaimer, the term of this patent is extended or adjusted under 35 U.S.C. 154(b) by 332 days.

(21) Appl. No.: 17/481,750

(22) Filed: Sep. 22, 2021

(65) Prior Publication Data

US 2023/0092451 A1 Mar. 23, 2023

(51) Int. Cl.
*B26B 15/00* (2006.01)

(52) U.S. Cl.
CPC .................................... *B26B 15/00* (2013.01)

(58) Field of Classification Search
CPC ...... B26B 15/00; B23D 29/00; B23D 29/005; B23D 29/02; B23D 29/026
USPC .......................................... 30/228, 199, 196
See application file for complete search history.

(56) References Cited

U.S. PATENT DOCUMENTS

| | | |
|---|---|---|
| 511,125 A | 12/1893 | Cochran |
| 511,966 A | 1/1894 | Olsen |
| 873,333 A | 12/1907 | Sweet |
| 1,359,031 A | 11/1920 | Coffman |
| 1,765,313 A | 6/1930 | Steindorff et al. |
| 1,839,009 A | 12/1931 | Bankson |
| 1,937,586 A | 12/1933 | Ortt |
| 2,222,317 A | 11/1940 | Martin |
| 2,567,129 A | 9/1951 | Shoffner |
| 2,635,335 A | 4/1953 | James |
| 2,642,658 A | 6/1953 | Johnson |
| 2,653,381 A | 9/1953 | Rooke |
| 2,818,643 A | 1/1958 | Dawson |
| 3,052,980 A | 9/1962 | Fieser |
| 3,157,948 A | 11/1964 | Schwartz |
| 3,178,816 A | 4/1965 | Schmid |
| 3,189,997 A | 6/1965 | Mount |
| 3,217,409 A | 11/1965 | Proffitt |
| 3,430,521 A | 3/1969 | Kulman |
| 3,585,719 A | 6/1971 | Kivela |
| 3,596,355 A | 8/1971 | Wertepny, Sr. |
| 3,601,894 A | 8/1971 | Keegan et al. |
| 3,710,445 A | 1/1973 | Roth |

(Continued)

FOREIGN PATENT DOCUMENTS

| | | |
|---|---|---|
| CN | 1792566 A | 6/2006 |
| CN | 1970239 A | 5/2007 |

(Continued)

*Primary Examiner* — Phong H Nguyen
(74) *Attorney, Agent, or Firm* — MCANDREWS HELD & MALLOY, LTD

(57) ABSTRACT

A tool includes a tool body, a tool head, and an actuator. The tool head is rotatable with respect to the tool body. The actuator can rotate together with the tool head. The actuator is movable between a first configuration and a second configuration. In the first configuration, the actuator and the tool head cannot rotate with respect to the tool body. In the second configuration, the actuator and the tool head can rotate with respect to the tool body.

20 Claims, 11 Drawing Sheets

(56) References Cited

U.S. PATENT DOCUMENTS

| | | | |
|---|---|---|---|
| 3,876,015 | A | 4/1975 | Kivela |
| 3,999,110 | A | 12/1976 | Ramstrom et al. |
| 4,173,069 | A | 11/1979 | Hoffman et al. |
| 4,597,227 | A | 7/1986 | Gentischer et al. |
| 4,625,462 | A | 12/1986 | Fushiya et al. |
| 4,669,190 | A | 6/1987 | Innami et al. |
| 4,682,416 | A | 7/1987 | Stolfa |
| 4,688,329 | A | 8/1987 | Oord |
| D295,824 | S | 5/1988 | Hoshino et al. |
| 4,827,616 | A | 5/1989 | Sistare |
| 4,880,015 | A | 11/1989 | Nierman |
| 4,903,408 | A | 2/1990 | Tagawa et al. |
| 5,020,281 | A | 6/1991 | Neff |
| 5,054,202 | A | 10/1991 | Takigawa et al. |
| 5,165,172 | A | 11/1992 | Weinrauch |
| 5,172,479 | A | 12/1992 | Herbert |
| D347,153 | S | 5/1994 | Uneyama |
| D351,772 | S | 10/1994 | Price |
| 5,566,454 | A | 10/1996 | Eisenbraun |
| 5,606,799 | A | 3/1997 | Melton |
| 5,642,566 | A | 7/1997 | Hirabayashi |
| 5,832,611 | A | 11/1998 | Schmitz |
| 5,901,447 | A | 5/1999 | Dunning |
| 5,992,024 | A | 11/1999 | Rogers |
| 5,993,303 | A | 11/1999 | Fladgard et al. |
| 6,057,608 | A | 5/2000 | Bailey, Jr. et al. |
| 6,178,643 | B1 | 1/2001 | Erbrick et al. |
| 6,304,058 | B2 | 10/2001 | Watson et al. |
| 6,311,583 | B1 | 11/2001 | Izumisawa |
| 6,329,788 | B1 | 12/2001 | Bailey et al. |
| 6,446,734 | B1 | 9/2002 | Williams et al. |
| 6,502,312 | B2 | 1/2003 | Beutel et al. |
| 6,515,451 | B2 | 2/2003 | Watson et al. |
| 6,536,116 | B2 | 3/2003 | Fung |
| 6,562,509 | B1 | 5/2003 | Eggert |
| 6,653,815 | B2 | 11/2003 | Watson et al. |
| 6,658,089 | B1 | 12/2003 | Mohr et al. |
| 6,662,451 | B1 | 12/2003 | Cheng |
| 6,671,969 | B2 | 1/2004 | Phillips et al. |
| 6,776,150 | B2 | 8/2004 | Gaidjiergis et al. |
| D506,653 | S | 6/2005 | Elsworthy |
| 6,913,087 | B1 | 7/2005 | Brotto et al. |
| 6,921,285 | B2 | 7/2005 | Glauning |
| 6,928,902 | B1 | 8/2005 | Eyssallenne |
| 6,935,438 | B2 | 8/2005 | Hofmann et al. |
| 6,983,809 | B2 | 1/2006 | Leitenberger et al. |
| 6,996,909 | B1 | 2/2006 | Buck et al. |
| 7,005,831 | B2 | 2/2006 | Watson et al. |
| 7,024,966 | B2 | 4/2006 | Chao |
| 7,063,171 | B2 | 6/2006 | Totsu |
| D525,847 | S | 8/2006 | Feldmann |
| D527,966 | S | 9/2006 | Hayakawa et al. |
| D528,382 | S | 9/2006 | Baslar |
| 7,100,373 | B2 | 9/2006 | Oide |
| 7,111,364 | B2 | 9/2006 | Bader et al. |
| D536,585 | S | 2/2007 | Baskar |
| 7,204,026 | B2 | 4/2007 | Phillips et al. |
| 7,248,019 | B2 | 7/2007 | Ookubo et al. |
| 7,251,896 | B2 | 8/2007 | Khubani |
| 7,291,061 | B2 | 11/2007 | Kiss |
| 7,291,062 | B2 | 11/2007 | Kiss et al. |
| 7,370,423 | B1 | 5/2008 | Huang |
| 7,464,473 | B2 | 12/2008 | Fladgard et al. |
| 7,540,093 | B1 | 6/2009 | Yeh |
| 7,581,319 | B1 | 9/2009 | Little et al. |
| 7,752,760 | B2 | 7/2010 | Baskar et al. |
| 7,930,833 | B2 | 4/2011 | Baskar et al. |
| 7,971,360 | B2 | 7/2011 | Clark et al. |
| 8,079,151 | B2 | 12/2011 | Chen |
| 8,122,607 | B2 | 2/2012 | Maniwa et al. |
| 8,136,257 | B2 | 3/2012 | Lau |
| 8,266,991 | B2 | 9/2012 | Thorson et al. |
| 8,567,521 | B2 | 10/2013 | Lau |
| 8,677,627 | B2 | 3/2014 | Li et al. |
| 8,683,704 | B2 | 4/2014 | Scott et al. |
| 8,763,257 | B2 | 7/2014 | Thorson |
| 8,793,886 | B2 | 8/2014 | Yamaoka |
| 9,434,013 | B2 | 9/2016 | Johnson |
| 9,764,486 | B2 | 9/2017 | Bublitz |
| 2003/0015066 | A1 | 1/2003 | Chao |
| 2003/0102844 | A1 | 6/2003 | Bailey |
| 2003/0136003 | A1 | 7/2003 | Casttelmani |
| 2004/0088817 | A1 | 5/2004 | Cochran et al. |
| 2004/0118257 | A1 | 6/2004 | Kratzmaier |
| 2005/0073282 | A1 | 4/2005 | Carrier et al. |
| 2005/0077878 | A1 | 4/2005 | Carrier et al. |
| 2005/0115081 | A1 | 6/2005 | Tu |
| 2006/0071643 | A1 | 4/2006 | Carrier et al. |
| 2006/0108981 | A1 | 5/2006 | Watson et al. |
| 2006/0151189 | A1 | 7/2006 | Wu |
| 2006/0220605 | A1 | 10/2006 | Funabashi et al. |
| 2006/0220612 | A1 | 10/2006 | Feldmann et al. |
| 2007/0193761 | A1 | 8/2007 | Brotto |
| 2007/0240892 | A1 | 10/2007 | Brotto et al. |
| 2008/0222898 | A1 | 9/2008 | Staples |
| 2008/0284373 | A1 | 11/2008 | Watson et al. |
| 2008/0295340 | A1 | 12/2008 | Carlucci et al. |
| 2008/0301948 | A1 | 12/2008 | Kostner et al. |
| 2009/0271991 | A1 | 11/2009 | Clark et al. |
| 2010/0037469 | A1 | 2/2010 | Chubb |
| 2011/0209888 | A1 | 9/2011 | Elsworthy |
| 2013/0219725 | A1 | 8/2013 | Winkel et al. |
| 2013/0283985 | A1 | 10/2013 | Vangura |
| 2014/0007433 | A1 | 1/2014 | Kochi et al. |
| 2016/0023289 | A1 | 1/2016 | Moss et al. |
| 2016/0039019 | A1* | 2/2016 | Bublitz ..................... B25F 5/02 30/277.4 |
| 2020/0000242 | A1 | 1/2020 | Ermalovich et al. |
| 2020/0139459 | A1* | 5/2020 | Nagasaka ............... B26B 15/00 |

FOREIGN PATENT DOCUMENTS

| | | | |
|---|---|---|---|
| EP | 1973181 | A1 | 9/2008 |
| FR | 2947201 | A1 | 12/2010 |
| JP | 2001143678 | A | 5/2001 |
| JP | 2001351592 | A | 12/2001 |
| JP | 2002260619 | A | 9/2002 |
| WO | 2006052825 | A2 | 5/2006 |

* cited by examiner

ROTATABLE TOOL HEAD

CROSS REFERENCE TO RELATED APPLICATIONS

[Not Applicable]

BACKGROUND

The present application relates to a power tool with a tool head, in which the orientation of the tool head can be adjusted. Such tools could include metal shears, a right angle drill, a reciprocating saw, or any other tool where the orientation of a tool head relative to the body of the tool may be advantageously adjustable.

For example, the tool head for metal shears can be adjustable to allow the user to quickly customize the cutting head orientation based upon orientation of the material being cut.

SUMMARY

According to embodiments of the present invention, a system includes a tool body, a tool head (e.g., a shear), and an actuator. The tool body houses a motor. The tool head is rotatable with respect to the tool body (e.g. it can rotate 360 degrees). The actuator is rotatable with the tool head. The actuator is moveable between a first configuration and a second configuration. For example, when moving between the first configuration and the second configuration, the actuator moves towards the tool head and away from the tool body. In the first configuration, the positions of the actuator and the tool head are rotatably fixed with respect to the tool body. In the second configuration, the actuator and the tool head can rotate with respect to the tool body.

The system can also include a driveshaft mechanically coupled to the motor and the tool head. The driveshaft is configured to transfer rotational energy from the motor to the tool head. The driveshaft passes through a hollow interior region of the actuator. The system can also include a spring that maintains the actuator in the first configuration when no engagement force is applied to the actuator, and automatically moves the actuator from the second configuration into the first configuration when the engagement force is removed from the actuator.

The system can include a core attached to or integrated with the tool body. The core has a plurality of recesses. The actuator has at least one prong, which can be positioned in a corresponding one of the recesses in the core when the actuator is in the first configuration. In this configuration, a positional arrangement of the at least one prong of the actuator and the corresponding at least one recess in the core prevent rotational movement of the actuator with respect to the tool body. The at least one prong can also be positioned outside of the corresponding recess in the core when the actuator is in the second configuration, thereby allowing rotational movement of the actuator with respect to the tool body. When the actuator is moved between the first configuration and the second configuration, a distance between the tool body and the tool head can remain substantially constant.

The system can include a cap that mounts to the tool head and engages with the actuator to maintain a constant rotational relationship between the cap and the actuator. The actuator can move with respect to the cap when the actuator is moved between the first configuration and the second configuration.

According to embodiments of the present invention, a system for mounting a tool head to a tool body includes a core, cap, and actuator. The core is attached to or integrated with the tool body. The core includes a hollow interior region and a plurality of recesses. The cap mounts to the tool head and the core, wherein the cap includes a hollow interior region. The actuator can also mount to the core (e.g., the actuator can have a toroidal shape with a hollow interior region that receives the core). The actuator is interposed at least partially between the cap and a portion of the core. The actuator and the cap rotate together with respect to the core (e.g., 360 degrees). The actuator can be positioned, with respect to the core, in a first locked position, a second locked position, and a rotatable configuration to rotate between the first locked position and the second locked position.

The system can also include a spring at least partially interposed between the cap and the actuator. The actuator can receive an engagement force to move the actuator into the rotatable configuration and compress the spring. The spring decompresses when the engagement force is removed, and the actuator moves into one of the first locked position or the second locked position. When the actuator moves to the rotatable configuration, the actuator can move longitudinally towards the cap.

The actuator can include at least one prong (e.g., two prongs) that can be positioned in a corresponding recess in the core (e.g., in a shoulder of the core) when the actuator is in the first locked position. In this position a positional arrangement of the at least one prong and the corresponding recess in the core prevent rotational movement of the actuator with respect to the core. The at least one prong can further be positioned outside of the corresponding recess in the core when the actuator is in the rotatable configuration, thereby allowing rotational movement of the actuator with respect to the core. When the actuator is moved between the first locked position and the rotatable configuration, a distance between the core and the cap can remain constant.

Figure 1A:
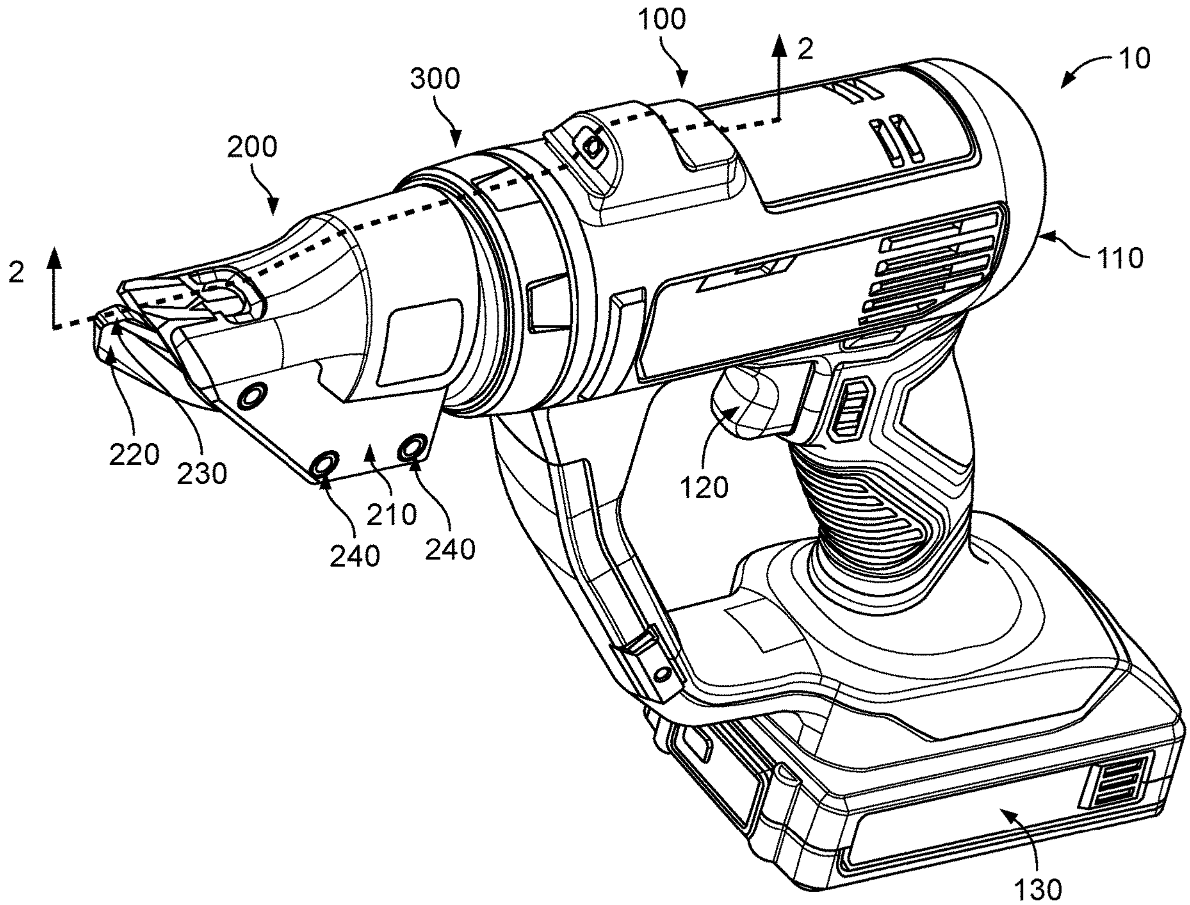
FIGS. 1A and 1B illustrate a tool with a tool head in a first orientation and a second orientation, respectively, according to embodiments of the present invention.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

According to embodiments of the present invention, a power tool 10, such as metal shears, includes a tool head 200 with a rotatable or adjustable orientation with respect to the tool body 100. This permits an operator to rotate the tool head 200 to a desired orientation with respect to the tool body 100. Once oriented as desired, the tool head 200 is disposed in a non-rotatable configuration with respect to the tool body 100. The adjustable tool head 200 facilitates different types of operations performable with the tool 10. Whereas a metal shears power tool 10 is primarily discussed herein, the techniques of the present invention can apply to other tools and corresponding tool heads, such as a right angle drill or a reciprocating saw.

According to embodiments of the present invention, a manually adjustable actuator 320 is movable between two configurations: a rotatable configuration; and a rotatably-locked configuration. The configuration of the actuator 320 determines whether the tool head 200 is rotatable or rotatably-locked. In the default or resting state, the actuator 320 and the tool head 200 are maintained in the rotatably-locked configuration. This ensures that the general orientation of the tool head 200 will not move during operation on a work piece.

According to embodiments of the present invention, the tool head 200 is placed in the rotatable configuration when the operator pulls the actuator 320 towards the tool head 200 (and away from the tool body 100). In the rotatable configuration, the actuator 320 and the tool head 200 can be rotated into a desired orientation with respect to the tool body 100. To place the actuator 320 and tool head 100 in the rotatably-locked configuration, the operator releases or directs the actuator 320 towards the tool body 100 and away from the tool head 200. Releasing, rotating, and locking the actuator 320 can be performed by one hand of the operator.

According to embodiments of the present invention, the actuator 320 is a part of an adjustment subsystem 300 that also includes a core 310, a cap 330, and a spring 340. The core 310 is fixedly attached to the tool body 100 such that it is not selectively movable with respect to the tool body 100. The cap 330 is affixed to the tool head 200. The distance between the tool body 100 and the cap 330 is fixed. The cap 330, however, can rotate around a primary axis of the adjustment system 300, thereby causing the affixed tool head 200 to rotate as well. The actuator 320 is located between the cap 330 and the core 310. The rotation of the cap 330 is constrained to the rotation of the actuator 320. Therefore, when the actuator 320 is in the rotatable configuration, both the actuator 320 and the cap 330 (and the affixed tool head 200) can rotate around the primary axis of the adjustment subsystem 300. And similarly, when the actuator 320 is in the rotatably-locked configuration, neither the actuator 320 nor the cap 330 (nor the affixed tool head 200) can rotate. The spring 340 biases the actuator 320 such that it remains in the rotatably-locked configuration when an operator does not apply an external force to overcome the spring's 340 biasing force.

The adjustment subsystem 300 includes a hollow interior region through which a driveshaft 400 passes. The driveshaft 400 transfers energy between a motor in the tool body 100 and the tool head 200 to cause the tool head 200 to effectively operate on a work piece.

Figure 1B:
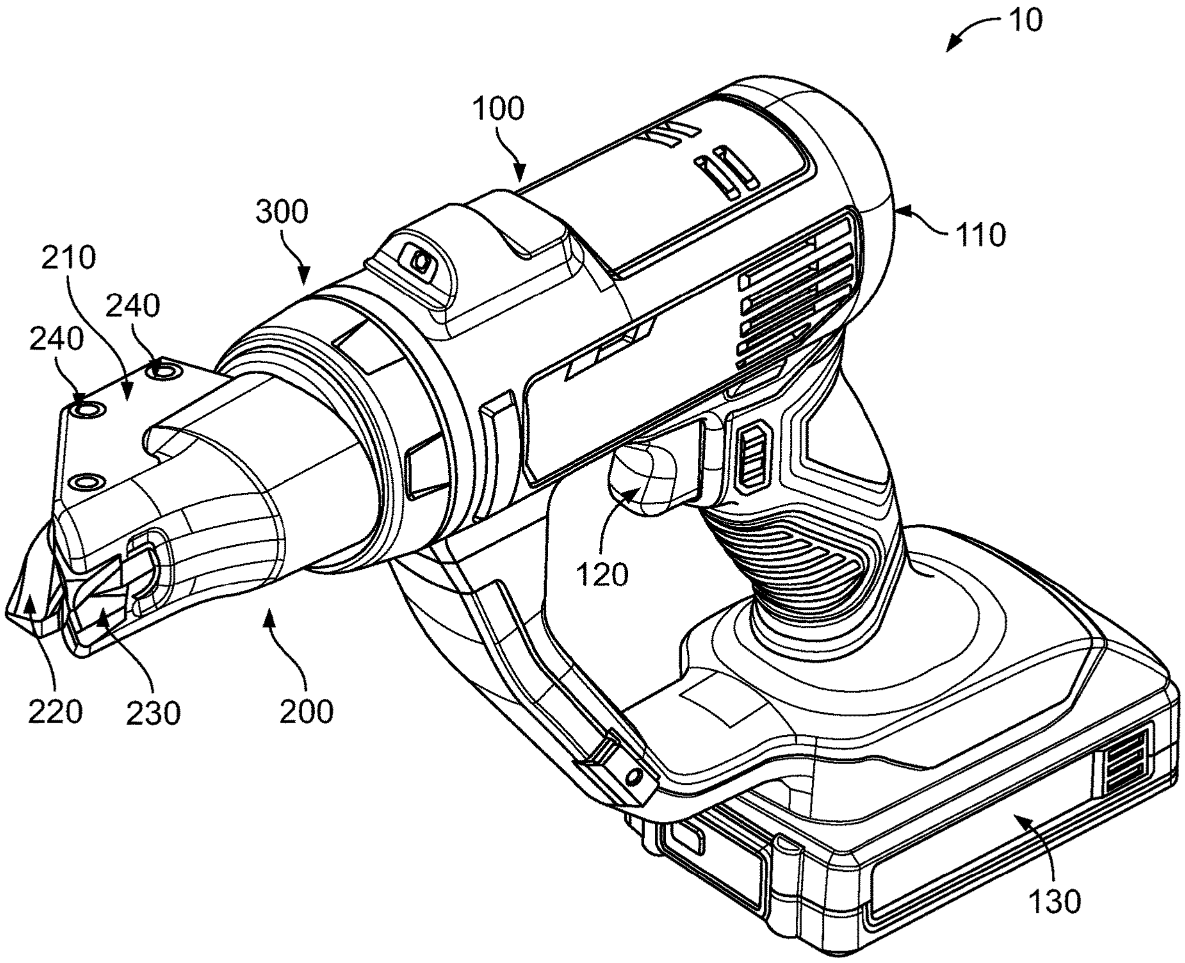

FIGS. 1A and 1B illustrate a metal shears tool 10 including tool body 100, a tool head 200, and an adjustment subsystem 300. The tool body 100 provides the necessary components to drive the tool head 200, which in turn interacts with a work piece. The adjustment subsystem 300 allows the operator to rotate the tool head 200 with respect to the tool body 100 before operating the tool 10. Different orientations of the tool head 200 can facilitate different operations of the tool 10 on a work piece, thereby allowing the operator to interact with the work piece in a variety of different angles and manners.

The operator directly interfaces with the tool body 100 prior to and during operation of the tool 10. The tool body 100 includes at least a housing 110, a motor (not shown) in the housing 110, a power source 130 for supplying power to the motor, and a trigger 120 for selectively powering the motor. In the illustrated embodiments of FIGS. 1A and 1B, the power source 130 is a removable, rechargeable battery pack. However, it will be understood that the power source 130 can be any other suitable power source such as an AC source or other DC power source.

The tool head 200 is coupled to the adjustment subsystem 300. The tool head 200 is also coupled to the tool body 100 via the core 310 of the adjustment subsystem 300, as will be further explained below. The operator can selectively rotate the tool head 200 to one of a plurality of discrete orientations with respect to the tool body 100. FIG. 1A illustrates the tool head 200 placed in a first discrete orientation (a zero degree rotational angle), and FIG. 1B illustrates the tool head 200 rotated into a second discrete orientation (a 90 degree rotational angle). As will be described below, the tool head 200 in the illustrated embodiments can be selectively oriented in one of twelve discrete orientations, although more or fewer orientations could be implemented.

Figure 2:
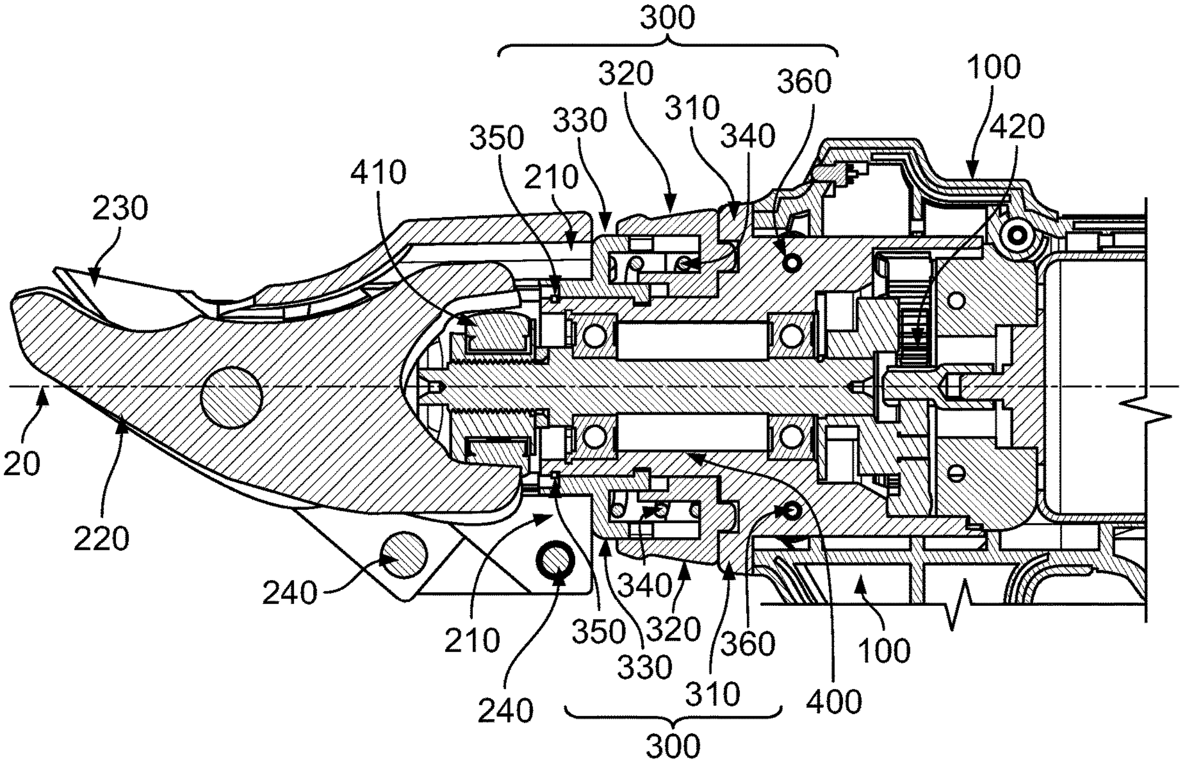
FIG. 2 illustrates a cross-sectional view of a portion of a tool including a tool head taken along 2-2 of FIG. 1A, according to embodiments of the present invention.

The tool head 200 includes a working implement that physically interacts with a work piece. The tool head 200 also includes an attachment mechanism, which secures the tool head 200 to the adjustment subsystem 300. Additional details of these aspects of the tool head 200 are depicted in FIG. 2, which is a cross-sectional view of a portion of system 10 including the tool body 100, the tool head 200, and the adjustment subsystem 300. As for the working implement, the illustrated metal shears tool head 200 has two blades 220 and 230. Blade 220 is movable and blade 230 is fixed with respect to the tool head casing 210. Together, the blades 220, 230 operate to cut a selected substrate such as sheet metal. The movable blade 220 receives mechanical energy from the motor in a conventional manner such as via intermediate components, including one or more gears 420, a driveshaft 400 mechanically coupled to the gears 420, and a cam 410 to transfer rotational energy from the driveshaft 400 to the movable blade 220. The tool head 200 need not be a metal shear. The tool head 200 could also be one for a right-angle drill, a reciprocating saw, an oscillating tool, or the like.

The tool head 200 is mounted indirectly to the tool body 100. Particularly, the tool head 200 is mounted to the adjustment subsystem 300, which in turn is mounted to the tool body 100. Mounting of the tool head 200 to the adjustment subsystem 300 is performed by the tool head casing 210 and at least one tightener or fastener 240. The casing 210 acts as a clamp. The casing 210 has an outer aperture that faces the tool body 100 and the adjustment subsystem 300. The aperture of the casing 210 slides over part of the adjustment subsystem 300. As shown, the casing 210 slides over a portion of the cap 330 of the adjustment subsystem 300. Once the orientation of the tool head 200 is in a suitable location with respect to the adjustment subsystem 300, the tighteners 240 tighten the casing 210 such that its aperture decreases in size and conforms to an outer surface of the cap 330. This forms a friction fit between the casing 210 and the cap 330, thereby securing the two components together. Alternatively, the tool head 200 (e.g., the casing 210) could be bolted to the cap 330 using one or more fasteners 240. These are but two possibilities, and it will be appreciated that the tool head 200 can be mounted to the adjustment subsystem 300 in various other ways.

FIG. 2 further illustrates the relationship and interconnectivity between the tool body 100, the tool head 200, the adjustment subsystem 300, and the driveshaft 400. Also depicted is the primary axis 20, which defines a longitudinal dimension. As will be explained below in conjunction with FIGS. 3-6, the adjustment subsystem 300 includes a core 310, an actuator 320, and a cap 330. The tool head 200 is mounted to the cap 330 and the tool body 100 is mounted to the core 310. The core 310 can be attached to the tool body 100 (either directly or indirectly), for example, using fasteners 360. Alternatively, the core 310 can be integral with the tool body 100. In either case, the position of the core 310 is fixed with respect to the tool body 100. Whereas the orientation of the core 310 is fixed with respect to the tool body 100, other parts of the adjustment subsystem 300 are not. The actuator 320 and the cap 330 are each moveable with respect to the tool body 100. Further, because the tool head 200 is affixed to the cap 330, the tool head 200 is also moveable with respect to the tool body 100.

The driveshaft 400 extends between the tool body 100 and the tool head 200 along a primary axis 20 of the adjustment subsystem 300, while passing through the hollow interior of the adjustment subsystem 300. The driveshaft 400 is mechanically coupled on one end to the motor in the tool body 100 and on the other end to the moveable blade 220.

Each of FIGS. 3A-6B depict different views of the adjustment subsystem 300 and the various components thereof. In addition to the core 310, actuator 320, and cap 330, the adjustment subsystem 300 also includes a spring 340, a clip 350, and fasteners 360. As mentioned, the adjustment subsystem 300 can be placed in a locked configuration or an unlocked configuration.

Figure 3A:
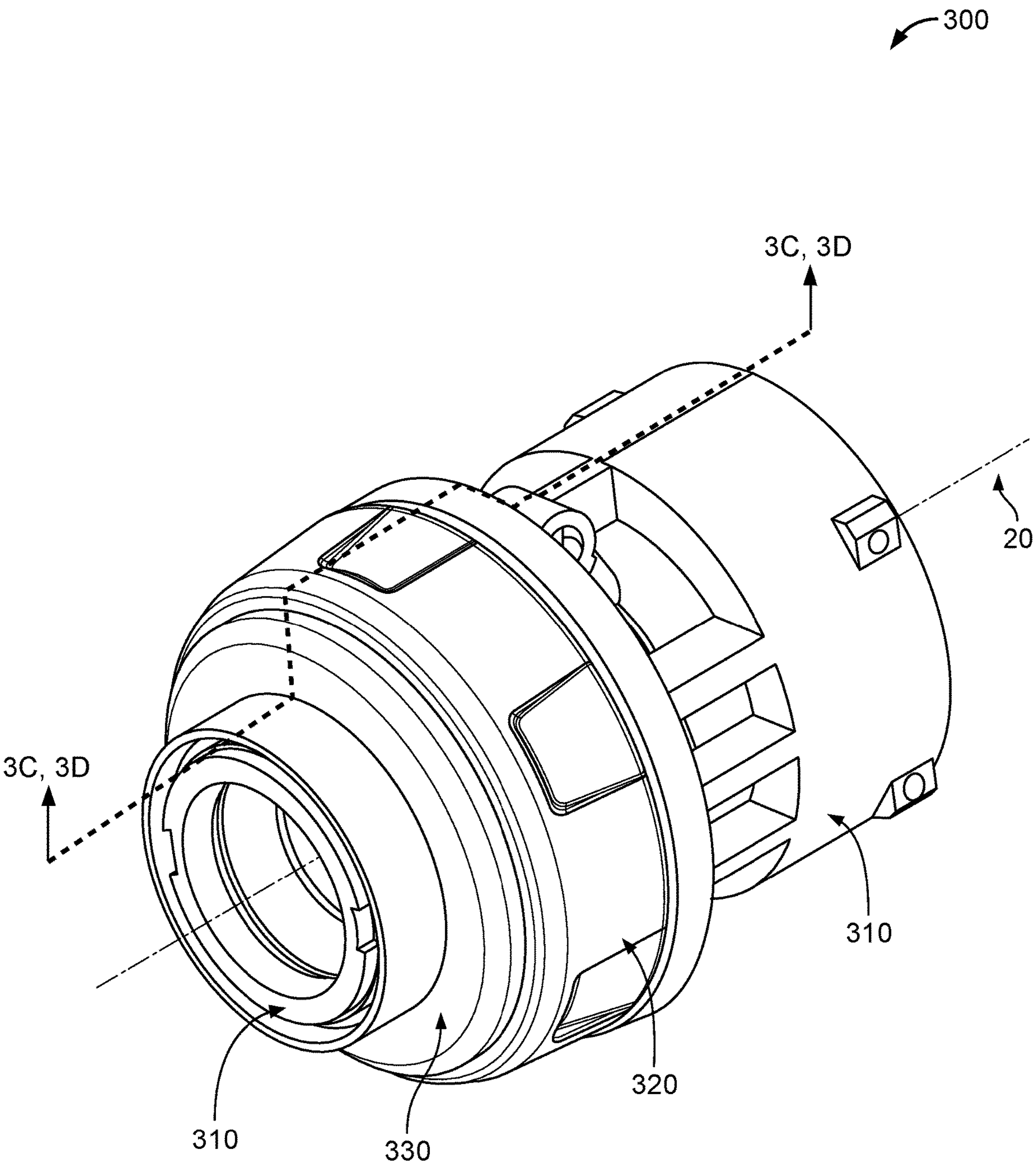
FIG. 3A illustrates a perspective view of an adjustment subsystem for adjusting an orientation of a tool head with respect to a tool body, according to embodiments of the present invention.
Figure 3B:
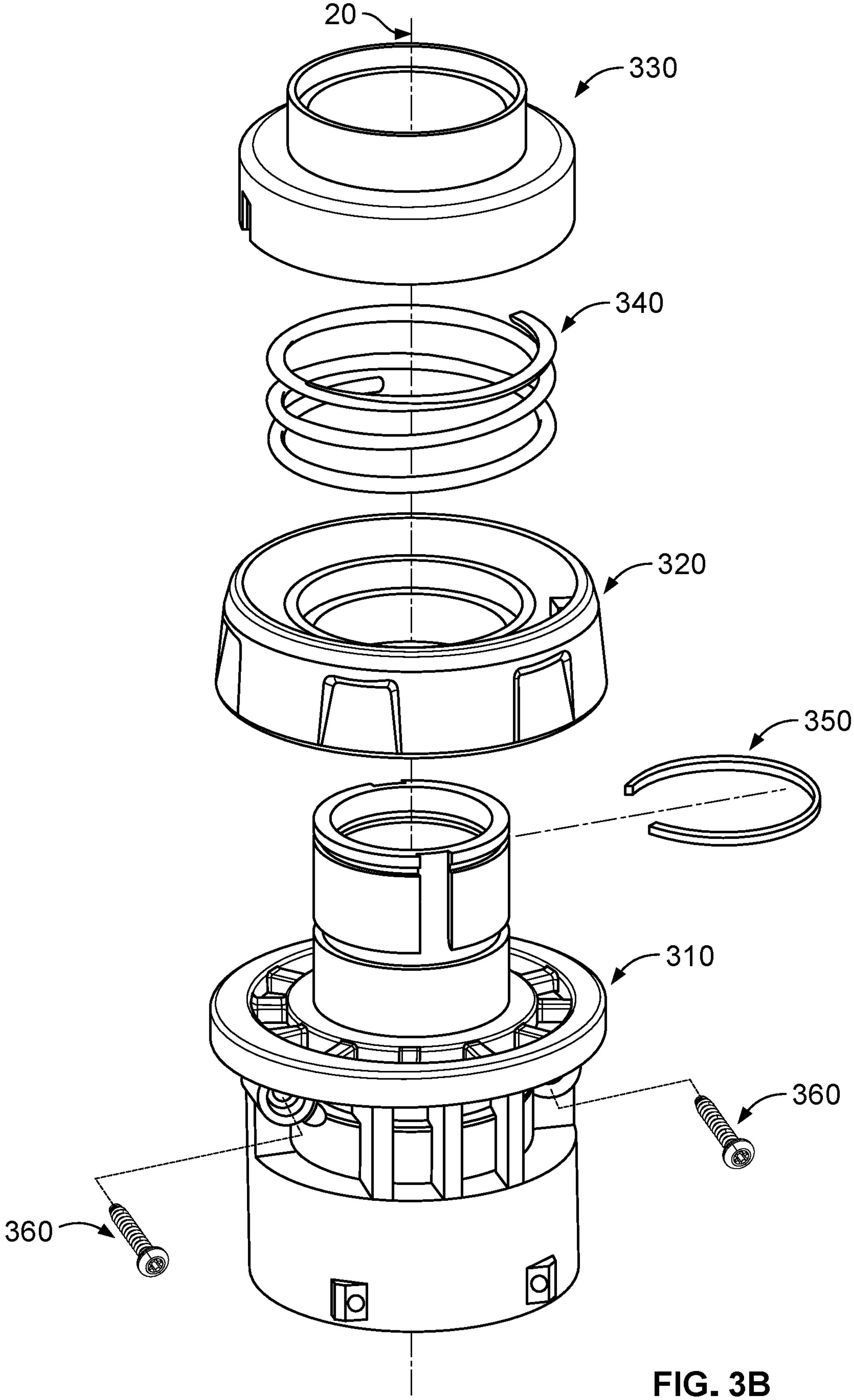
FIG. 3B illustrates an exploded view of an adjustment subsystem for adjusting an orientation of a tool head with respect to a tool body, according to embodiments of the present invention.
Figure 3C:
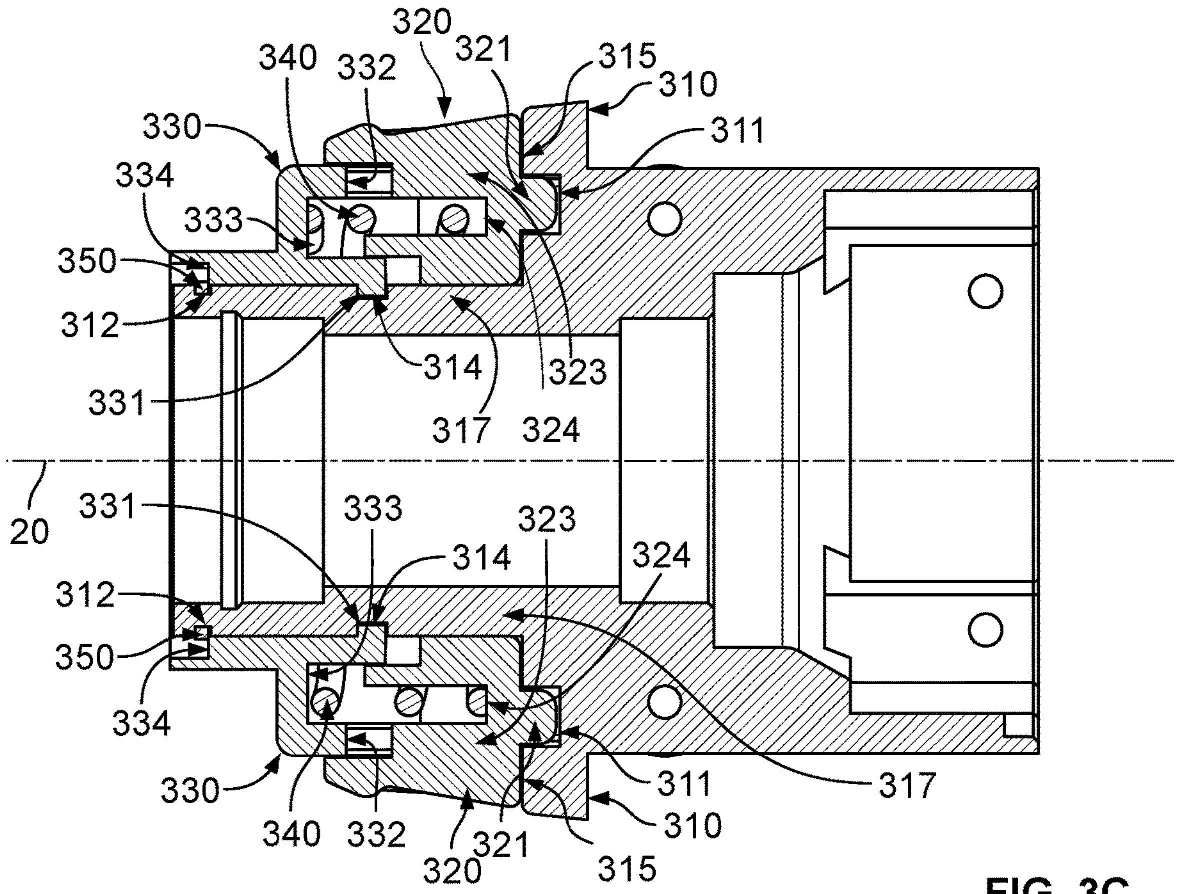
FIGS. 3C and 3D illustrate a cross-sectional view of an adjustment subsystem for adjusting an orientation of a tool head with respect to a tool body in a first configuration and a second configuration, respectively, taken along 3C, 3D-3C, 3D of FIG. 3A, according to embodiments of the present invention.
Figure 7A:
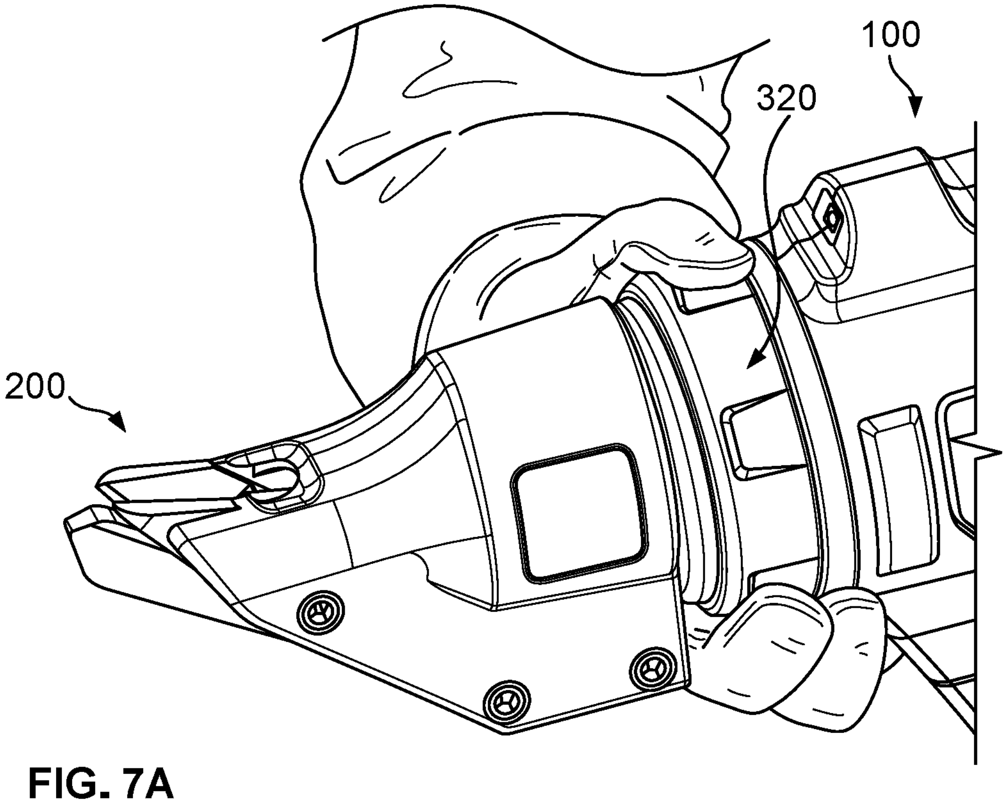
FIGS. 7A, 7B, 7C, and 7D illustrate a sequence for moving an orientation of a tool head with respect to a tool body from a first orientation to a second orientation, according to embodiments of the present invention.
Figure 7B:
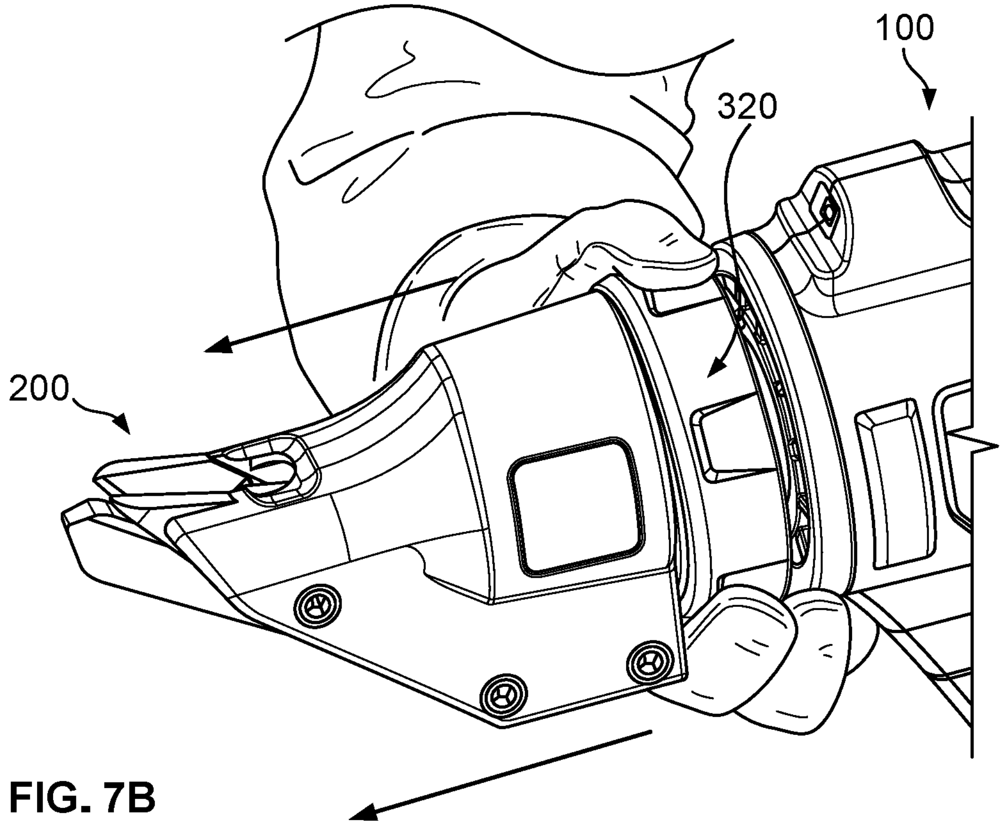
Figure 7C:
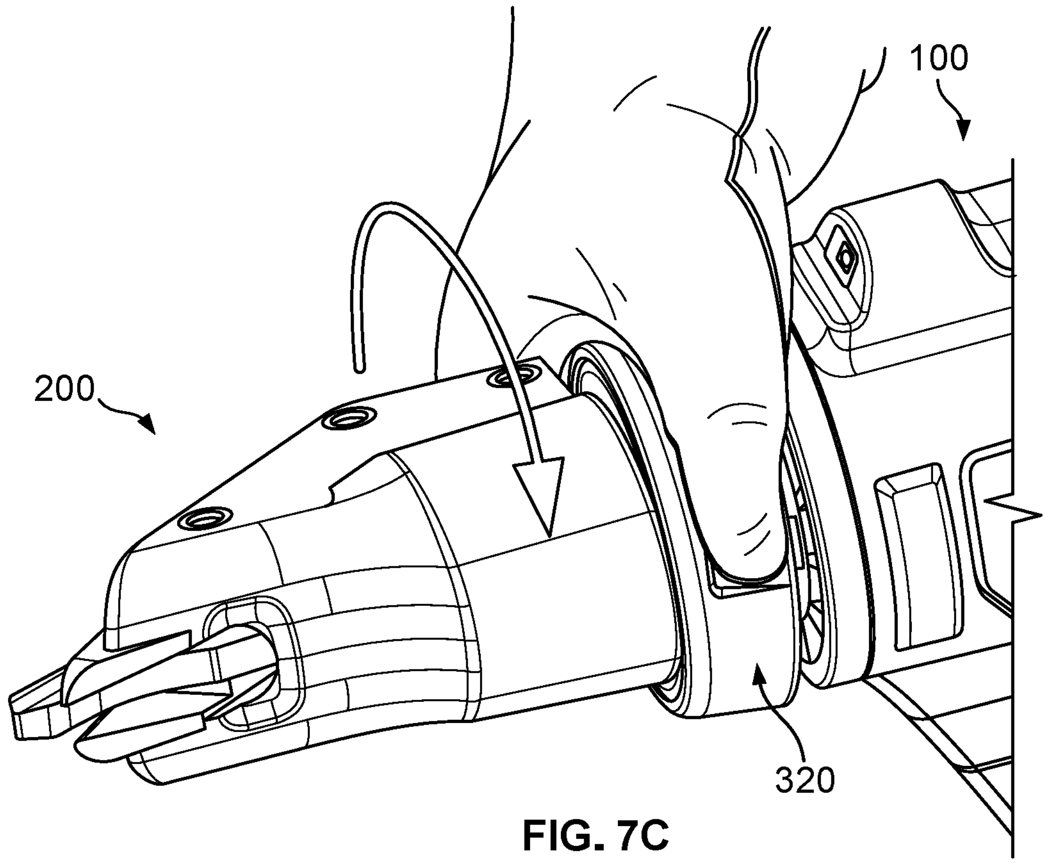
Figure 7D:
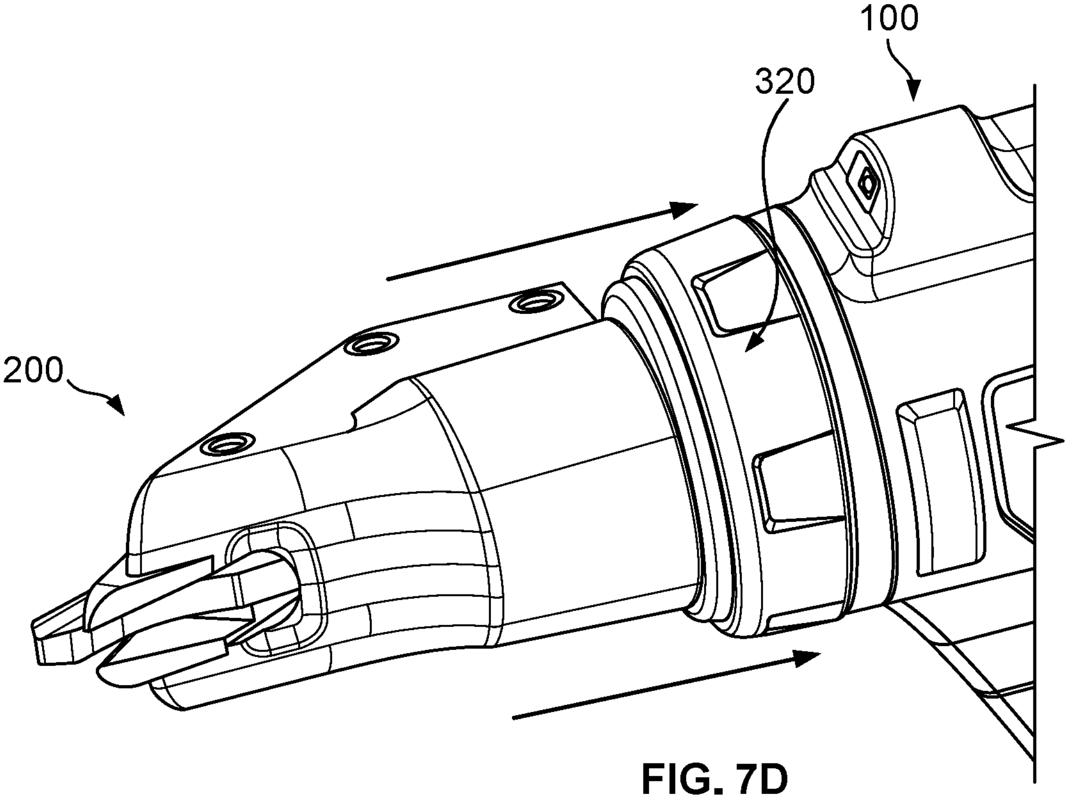

Normally, the adjustment subsystem 300 is in the locked configuration (shown in FIGS. 3C, 7A, and 7D). The actuator 320 and the tool head 200 are prevented from rotating around the primary axis 20 of the adjustment subsystem 300. Furthermore, the actuator 320 is limited to longitudinal movement.

To place the adjustment subsystem 300 into the unlocked configuration (shown in FIGS. 3D, 7B, and 7C), the actuator 320 is moved longitudinally towards the tool head 200. Then, the actuator 320 and the tool head 200 can rotate around the primary axis 20.

Figure 4:
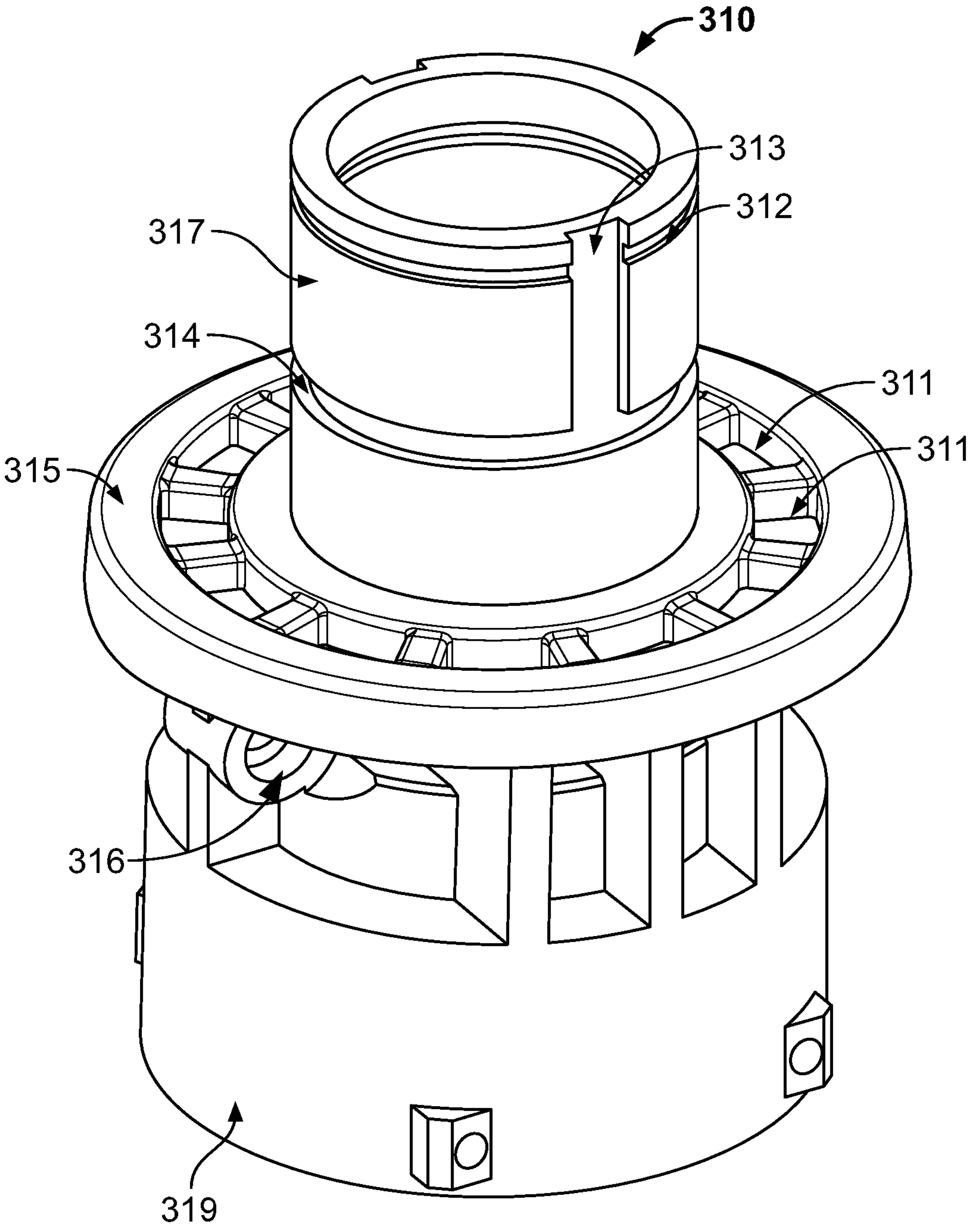
FIG. 4 illustrates a core, according to embodiments of the present invention.

FIG. 4 depicts an exemplary core 310. The core 310 defines a mounting hub 319 at a first end (bottom) for mounting on the tool body 100. Threaded openings 316 are provided for receiving fasteners 360 (shown in FIG. 3B) in order to secure the core 310 onto the tool body 100. A shoulder 315 is defined at an intermediate portion between the first end and the second end (top), and defines a plurality of radially- and equally-spaced recesses 311, each defining an axis parallel to the central axis of the core 310. A post 317 extends from the shoulder 315 to the second end. A first radial groove 314 is disposed in the post 317. The first radial groove 314 may extend entirely around the post 317 or not. A second radial groove 312 is disposed in the post 317 above the first radial groove 314. At least one longitudinal groove 313 extends from the first radial groove 314 and the second end.

Figure 5A:
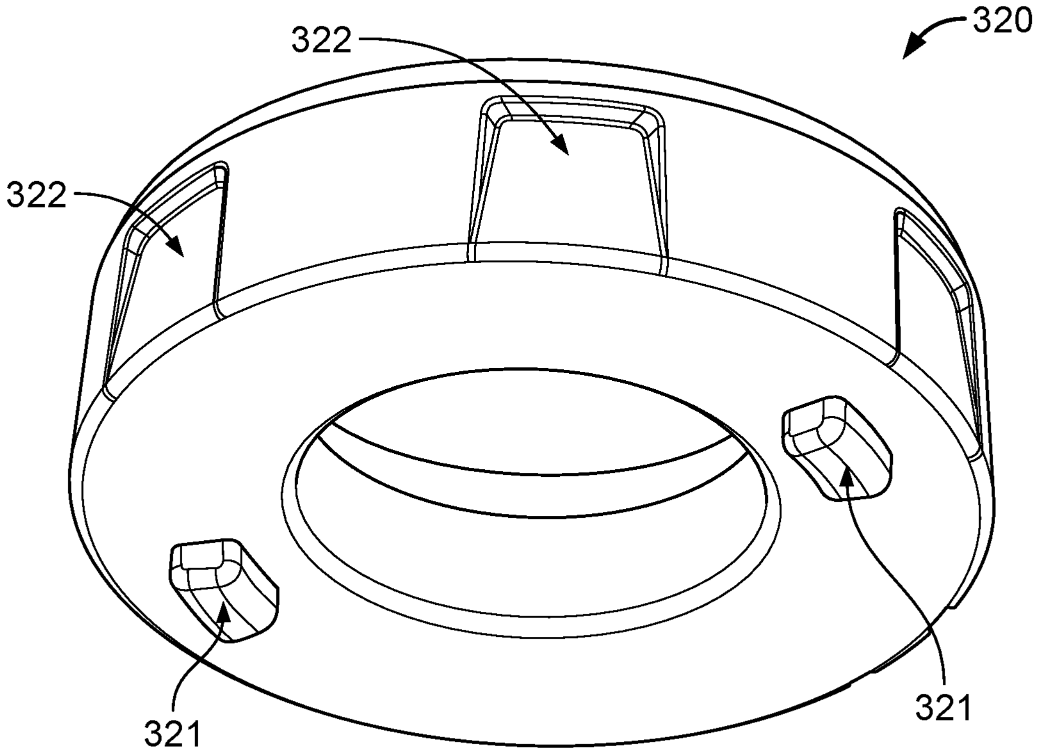
FIGS. 5A and 5B illustrate top and bottom perspective views of an actuator, respectively, according to embodiments of the present invention.
Figure 5B:
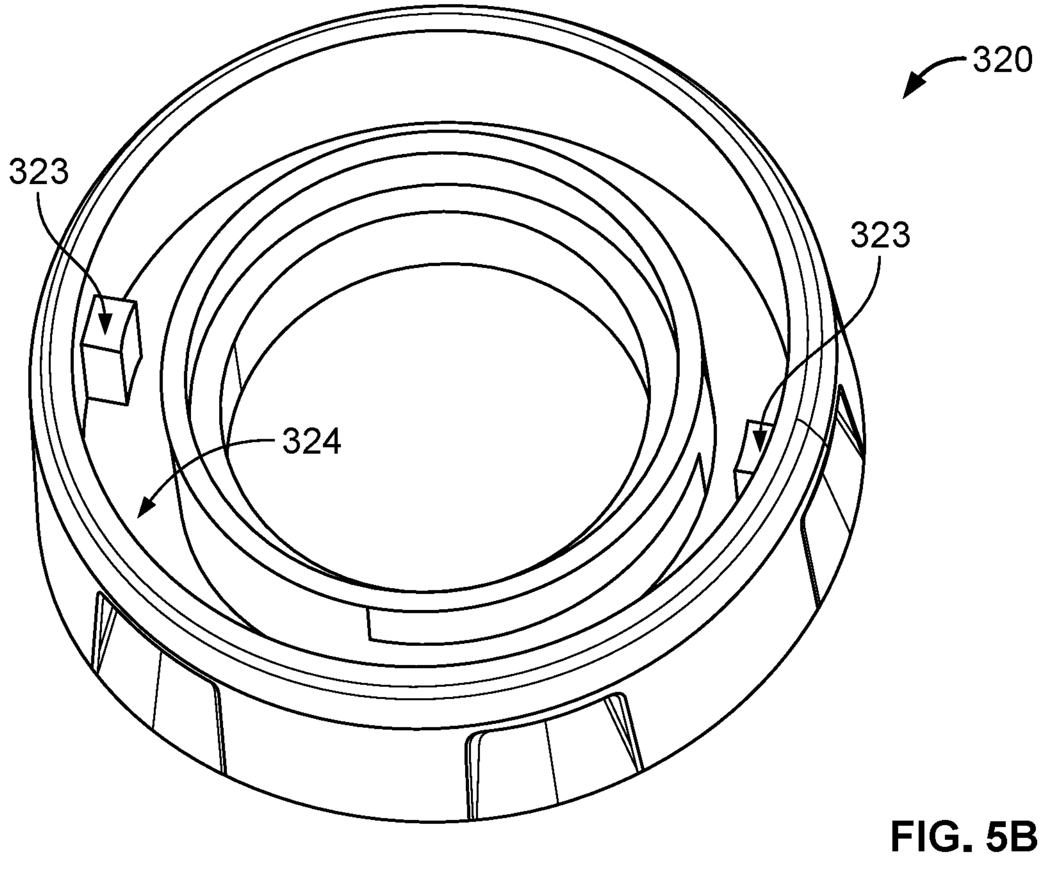

FIGS. 5A and 5B depict top and bottom perspective views of the actuator 320, respectively. As shown in FIG. 5A, the actuator 320 has a toroidal shape, but other shapes are possible. The actuator 320 includes one or more mating portions or prongs 321. The prongs 321 face the shoulder 315 of the core 310. The prongs 321 are shown as being disposed on opposing sides of the actuator 320, but can be disposed in any configuration such that each prong 321 is registered with one recess 311 defined by the core 310. The outer lateral surface of the actuator 320 has one or more recesses 322. Such recesses 322 facilitate an operator's secure grip on the actuator 320 when moving the actuator 320 or rotating the actuator 320 along with the tool head 200. Each recess 322 can be sized to receive an operator's finger pad. As shown in FIG. 5B, the actuator 320 has a recess 324 on the opposite side of the prongs 321. A plurality of tabs 323 are disposed within the recess 324.

Figure 6A:
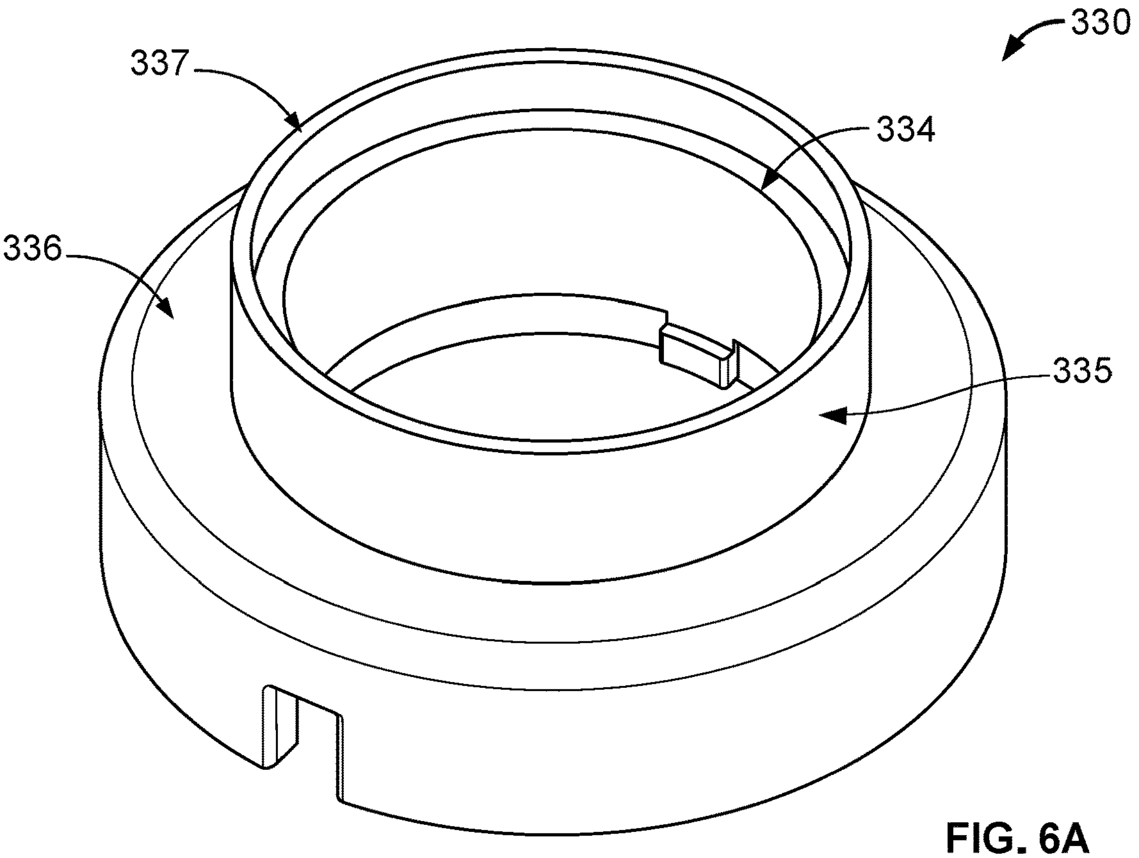
FIGS. 6A and 6B illustrate top and bottom perspective views of a cap, respectively, according to embodiments of the present invention.
Figure 6B:
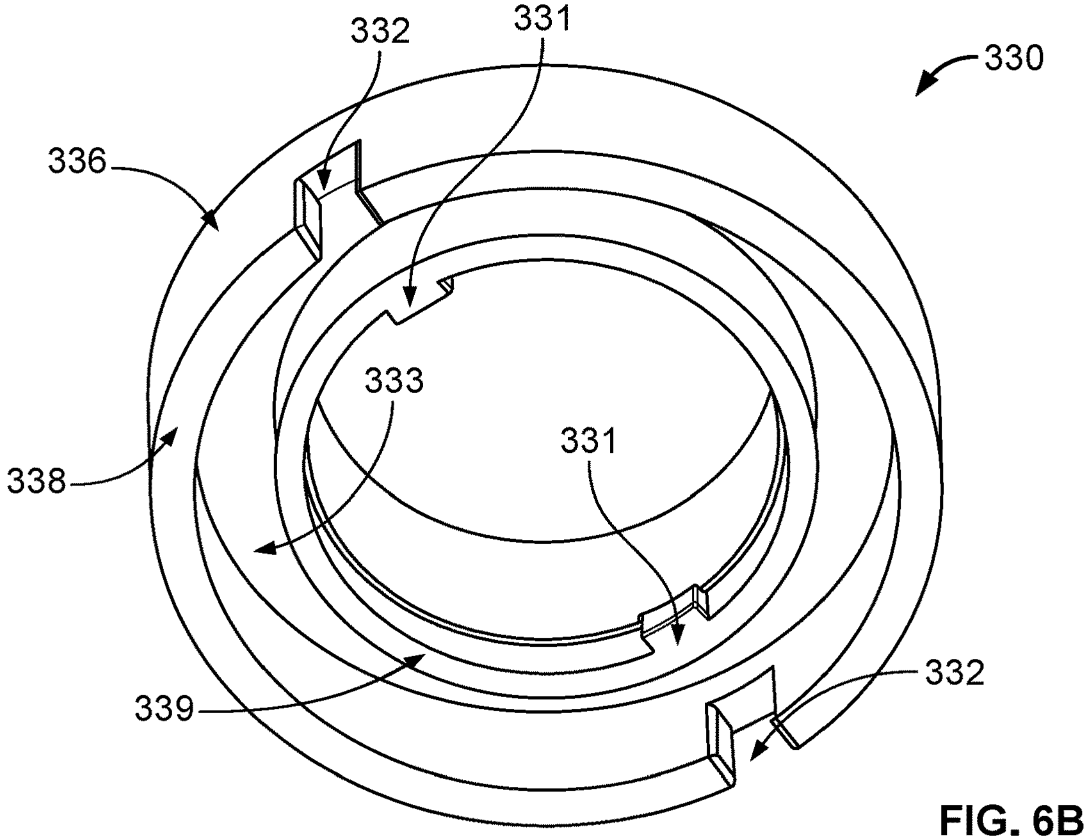

FIGS. 6A and 6B depict top and bottom perspective views of the cap 330, respectively. As shown in FIG. 6A, the cap 330 includes a base 336, from which a hollow cylinder 335 extends towards a first rim 337. The inner radius of the hollow cylinder 335 becomes larger towards the outer end. The interior area of the hollow cylinder 335 where the inner radius changes defines a shelf 334. As shown in FIG. 6B, the underside of the base 336 defines a recess 333. A plurality of slots 332 extend longitudinally in the base 336 to a second rim 338. A plurality of tabs 331 extend inwardly into a hollow interior region of the cap 330, and longitudinally to a third rim 339.

FIGS. 2 and 3A-3D depict the arrangement of the adjustment subsystem 300. The cap 330, spring 340, and actuator 320 are positioned around the post 317 of the core 310. Initially, the actuator 320 is placed around the post 317 such that it abuts the shoulder 315. Next, the spring 340 is placed around the post 317. A portion of the spring 340 is received by the recess 324 of the actuator 320. Then the cap 330 is rotated such that its tabs 331 align with the longitudinal grooves 313. The actuator 320 must also be rotated such that its tabs 323 align with the slots 332 in the cap 330.

Once the various features are aligned, the cap 330 is pressed over the post 317 towards the actuator 320 as the tabs 331 slide through the longitudinal grooves 331. The recess 333 of the cap 330 receives a portion of the spring 340. The tabs 323 of the actuator 320 are received by the slots 332 in the cap 330.

As the cap 330 is pressed towards the actuator 320, the spring 340 compresses between the cap 330 and the actuator 320. Once the first rim 337 of the cap 330 passes the second radial groove 312 of the core 310, the clip 350 can be inserted (e.g., snapped) into the second radial groove 312. After insertion, a portion of the clip 350 extends outwardly from the post 317. Then the cap 330 can be released, and the spring 340 will force the cap 330 away from the actuator 320. However, the portion of the clip 350 that extends outwardly from the post 317 will abut the shelf 334, thereby preventing the cap 330 from coming off of the post 317. The shelf 334 and the clip 350 will then constantly press against each other due to the force on the cap 330 exerted by the compressed spring 340.

Once assembled, the tabs 331 of the cap 330 will align with the first radial groove 314 of the core 310. The tabs 331 can move through the first radial groove 314, thereby permitting the cap 330 to rotate around the post 317 (up to 360 degrees, if the first radial groove 314 extends entirely around the post 317). At the same time, the tabs 331 cannot move longitudinally towards the shoulder 315, because they are locked into the first radial groove 314. This results in the cap 330 being constrained from any substantial longitudinal movement along the post 317, because on one end, the shelf 334 presses against the clip 350, and on the other, the tabs 331 cannot move past the first radial groove 314. Consequently, the cap 330 can only rotate. And because the cap 330 is attached to the tool head 200, the tool head 200 also can only rotate—i.e, it cannot move longitudinally.

Also after assembly, the tabs 323 of the actuator 320 will always be positioned within the slots 332. This couples the actuator 320 with the cap 330 (and the attached tool head 200) such that they must rotate together. While the tabs 323 will always remain in the slots 332, they are able to move longitudinally within the slots 332. This allows for longitudinal movement of the actuator 320 between the shoulder 315 of the post 310 and the cap 330.

Figure 3D:
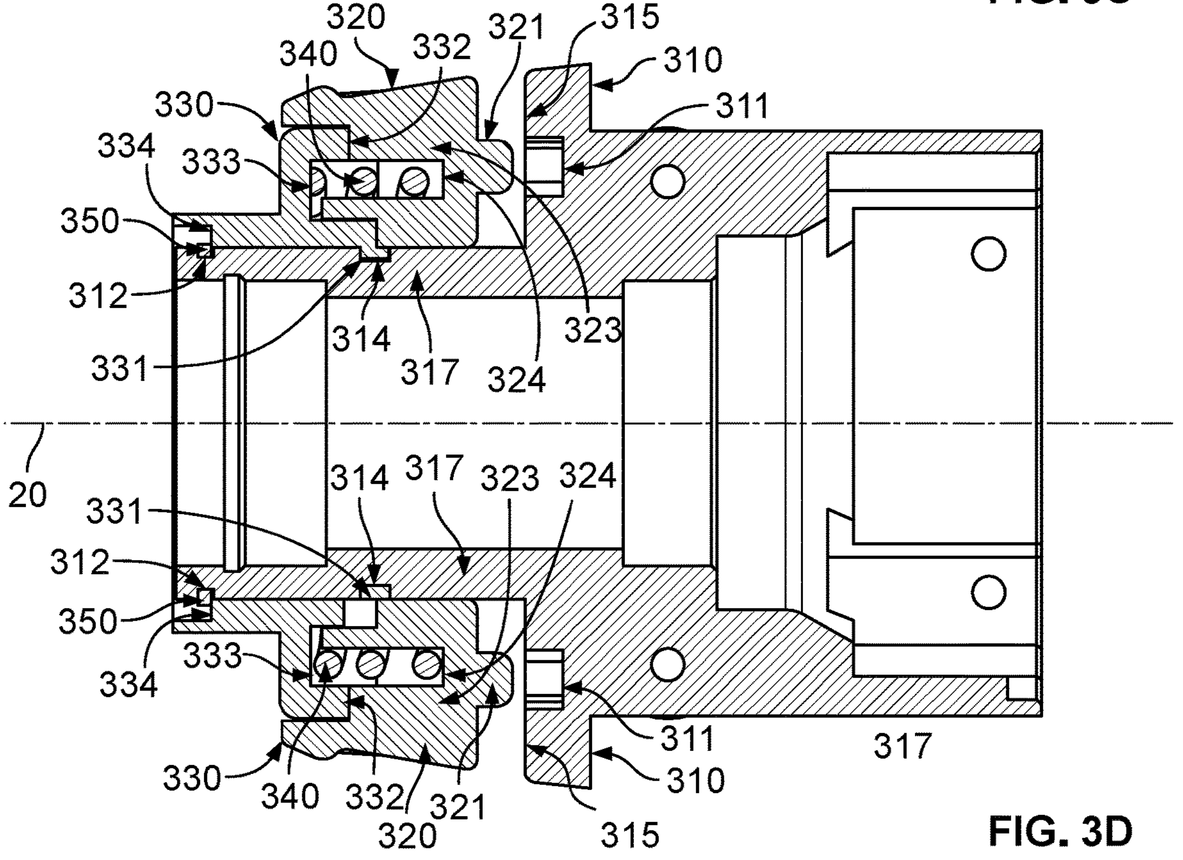

As mentioned, the adjustment subsystem 300 can be placed in a locked or unlocked configuration. Normally, it will be in the locked configuration, which is depicted in FIG. 3C. The unlocked configuration is shown in FIG. 3D. In the locked configuration, the recesses 311 of the core 310 receive the prongs 321 of the actuator 320. In the unlocked configuration, the prongs 321 are not received by the recesses 311. Again, the actuator 320 can only rotate in the unlocked configuration. Thus, the cap 330 and tool head 200 can only rotate in this configuration.

To place the adjustment subsystem 300 in the unlocked configuration, an external force is applied to the actuator 320 to move it longitudinally towards the cap 330 and tool head 200 (e.g., an operator pulls the actuator 320 towards the tool head 200). When the prongs 321 are fully outside of the recesses 311, the actuator 320 (and cap 330 and tool head 200) can rotate. As the actuator 320 rotates, the prongs 321 will align with different recesses. Also, because the position of the cap 330 is fixed longitudinally, the spring 340 compresses between the actuator 320 and the cap 330.

To place the adjustment subsystem 300 in the locked configuration, the actuator 320 is moved longitudinally towards the shoulder 315. This can occur automatically if the external force is removed from the actuator 320 (e.g., if the operator releases the actuator 320). Then, the compressed spring 340 will force actuator 320 away from the tool head 200 towards the shoulder 315. Once the prongs 321 are received by the recesses 311, the adjustment subsystem 300 is in the locked configuration.

The number of recesses 311 determines the number of possible orientations between the tool head 200 and the tool body 100. The spacing between the recesses 311 determine the rotational angle for each of these orientations. In the illustrated embodiment, there are twelve recesses 311, each separated by a rotational angle of thirty degrees. Furthermore, there are two prongs 321. According to design preferences, there can be different numbers of recesses 311 and/or prongs 321.

In FIG. 5A, the prongs 321 are depicted as having rounded edges. Tapered edges are also possible. These permit the adjustment subsystem 300 to smoothly transition from the unlocked configuration to the locked configuration. As the spring 340 decompresses and forces the actuator 320 towards the shoulder 315, the rounded/tapered edges of the prongs 321 can cause the actuator 320 to deflect (i.e., rotate slightly) if the prongs 321 and recesses 311 are not perfectly aligned. Specifically, if a rounded/tapered edge of a prong 321 falls on an edge of a recess 311, the actuator 320 will be forced to rotate. After sufficiently rotating, the prongs 321 and recesses 311 will align.

FIGS. 7A-7D illustrate an exemplary process for rotating the tool head 200 with respect to the tool body 100, according to embodiments of the present invention. As shown in FIG. 7A, the tool head 200 is in an upright orientation with respect to the tool body 100. The adjustment subsystem 300 is shown in a locked configuration, such that the tool head 200 cannot rotate around a primary axis of the adjustment subsystem 300. As illustrated in FIG. 7B, an operator applies an engagement force to move the actuator 320 away from the tool body 100 and towards the tool head 200. This places the adjustment subsystem 300 into an unlocked configuration, such that the tool head 200 can rotate with respect to the tool body 100. As shown in FIG. 7C, while the adjustment subsystem 300 is still in the unlocked configuration, the operator rotates the actuator 320 about the primary axis of the adjustment subsystem 300, and the tool head 200 rotates with respect to the tool body 100 in response to the operator moving the actuator 320. As shown, the tool head 200 rotates ninety degrees about the primary axis of the adjustment subsystem 300, although any number of degrees may be possible according to certain techniques disclosed herein. As depicted in FIG. 7D, the operator releases the actuator 320, thereby allowing the actuator 320 to automatically move away from the tool head 200 and towards the tool body 100. Alternatively, the operator may actively move the actuator 320 away from the tool head 200 and towards the tool body 100. This returns the adjustment subsystem 300 back into the locked configuration, such that the tool head 200 can no longer rotate with respect to the tool body 100.

While particular embodiments are illustrated and depicted, the principles described herein are applicable to other arrangements whereby an operator can use one hand to move the tool head into a variety of different orientations with respect to the tool body. For example, an equivalent system may be designed to allow an operator to pull directly on the tool head rather than on a separate actuator. By pulling directly on the tool head, the operator could move the tool head from a rotatably-locked configuration to a rotatable configuration. The operator, while still pulling on the tool head, then can adjust the orientation of the tool head. When the operator is satisfied with the new orientation of the tool head, the operator then releases the tool head and it snaps back into the rotatably-locked configuration.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A system comprising:
  a tool body that houses a motor;
  a tool head configured to rotate with respect to the tool body; and
  an actuator, wherein the actuator is rotatable with the tool head, and wherein the actuator is movable with respect to the tool head between:
    a first configuration, in which positions of the actuator and the tool head are rotatably fixed, and
    a second configuration, in which the actuator and the tool head are rotatable.

2. The system of claim 1, further comprising a driveshaft mechanically coupled to the motor and the tool head, wherein the driveshaft is configured to transfer rotational energy from the motor to the tool head, and wherein the driveshaft passes through a hollow interior region of the actuator.

3. The system of claim 1, further comprising a spring configured to:
  maintain the actuator in the first configuration when no engagement force is applied to the actuator; and
  automatically move the actuator from the second configuration into the first configuration when the engagement force is removed from the actuator.

4. The system of claim 1, wherein the tool head comprises a shear.

5. The system of claim 1, wherein when the actuator moves between the first configuration and the second configuration, the actuator moves towards the tool head and away from the tool body.

6. The system of claim 1, wherein the tool head is configured to rotate 360 degrees with respect to the tool body.

7. The system of claim 1, further comprising a core attached to or integrated with the tool body, wherein the actuator includes at least one prong configured to:
  be positioned in a corresponding at least one recess in the core when the actuator is in the first configuration, wherein a positional arrangement of the at least one prong of the actuator and the corresponding at least one recess in the core prevent rotational movement of the actuator with respect to the tool body; and
  be positioned outside of the corresponding at least one recess in the core when the actuator is in the second configuration, thereby allowing rotational movement of the actuator with respect to the tool body.

8. The system of claim 1, wherein when the actuator is moved between the first configuration and the second configuration, a distance between the tool body and the tool head remains substantially constant.

9. The system of claim 1, further comprising a cap configured to mount to the tool head, and engage the actuator to maintain a constant rotational relationship between the cap and the actuator.

10. The system of claim 9, wherein the actuator moves with respect to the cap when the actuator is moved between the first configuration and the second configuration.

11. A system for mounting a tool head to a tool body, the system comprising:
  a core attached to or integrated with the tool body, wherein the core includes a hollow interior region and a plurality of recesses;
  a cap configured to mount to the tool head and the core, wherein the cap includes a hollow interior region; and
  an actuator interposed at least partially between the cap and a portion of the core, wherein:
    the actuator and the cap are configured to rotate together with respect to the core, and
    the actuator is configured to be movably positioned, with respect to the core, in a first locked position, a second locked position, and a rotatable configuration to rotate between the first locked position and the second locked position.

12. The system of claim 11, further comprising a spring at least partially interposed between the cap and the actuator, wherein the actuator is configured to receive an engagement force to move the actuator into the rotatable configuration and compress the spring, and wherein the spring is configured to decompress when the engagement force is removed to move the actuator into one of the first locked position or the second locked position.

13. The system of claim 11, wherein when the actuator moves to the rotatable configuration, the actuator moves longitudinally towards the cap.

14. The system of claim 11, wherein the actuator includes at least one prong configured to:
  be positioned in a corresponding at least one recess in the core when the actuator is in the first locked position, wherein a positional arrangement of the at least one prong and the at least one recess in the core prevent rotational movement of the actuator with respect to the core; and
  be positioned outside of the at least one recess in the core when the actuator is in the rotatable configuration, thereby allowing rotational movement of the actuator with respect to the core.

15. The system of claim 14, wherein the at least one recess is disposed in a shoulder of the core.

16. The system of claim 15, wherein the at least one prong is two prongs.

17. The system of claim 11, wherein when the actuator is moved between the first locked position and the rotatable configuration, a distance between the core and the cap remains constant.

18. The system of claim 11, wherein the actuator is rotatable 360 degrees when the actuator is in the rotatable configuration.

19. The system of claim 11, wherein the actuator comprises a toroidal shape including a hollow interior region.

20. The system of claim 19, wherein a portion of the core extends through the hollow interior region of the actuator.

* * * * *